United States Patent [19]
Menzies et al.

[11] 4,136,925
[45] Jan. 30, 1979

[54] EXTERIOR-MOUNTED REAR ROTARY VISION MIRROR FOR A VEHICLE

[75] Inventors: John I. Menzies; Maureen Menzies, both of Kenmore, Australia

[73] Assignee: Menzies Developments Pty. Ltd., Kenmore, Australia

[21] Appl. No.: 815,311

[22] Filed: Jul. 13, 1977

[30] Foreign Application Priority Data

Aug. 20, 1976, [AU] Australia .................................. 7090

[51] Int. Cl.² .............................................. G02B 5/08
[52] U.S. Cl. ......................................... 350/62; 350/63; 350/289
[58] Field of Search ........................... 350/62, 63, 289

[56] References Cited

U.S. PATENT DOCUMENTS

3,711,179   1/1973   Takeda .................................. 350/62

FOREIGN PATENT DOCUMENTS

2363072   7/1975   Fed. Rep. of Germany .......... 350/289

Primary Examiner—F. L. Evans
Attorney, Agent, or Firm—Donald D. Jeffery

[57] ABSTRACT

An exterior rear vision mirror for a vehicle is rotated about its axis, within its housing, by an electric motor, and is restrained from significant vibration by a flexible drive from the motor to the center of the mirror, and by stabilizer ring coaxial with the mirror and pressing against it to maintain it in the desired plane. In wet conditions, rain drops are thrown centrifugally from the mirror, keeping it clear. In dry conditions, the mirror may be cleaned of dust by water directed from a nozzle onto the central part of the rotating mirror.

5 Claims, 3 Drawing Figures

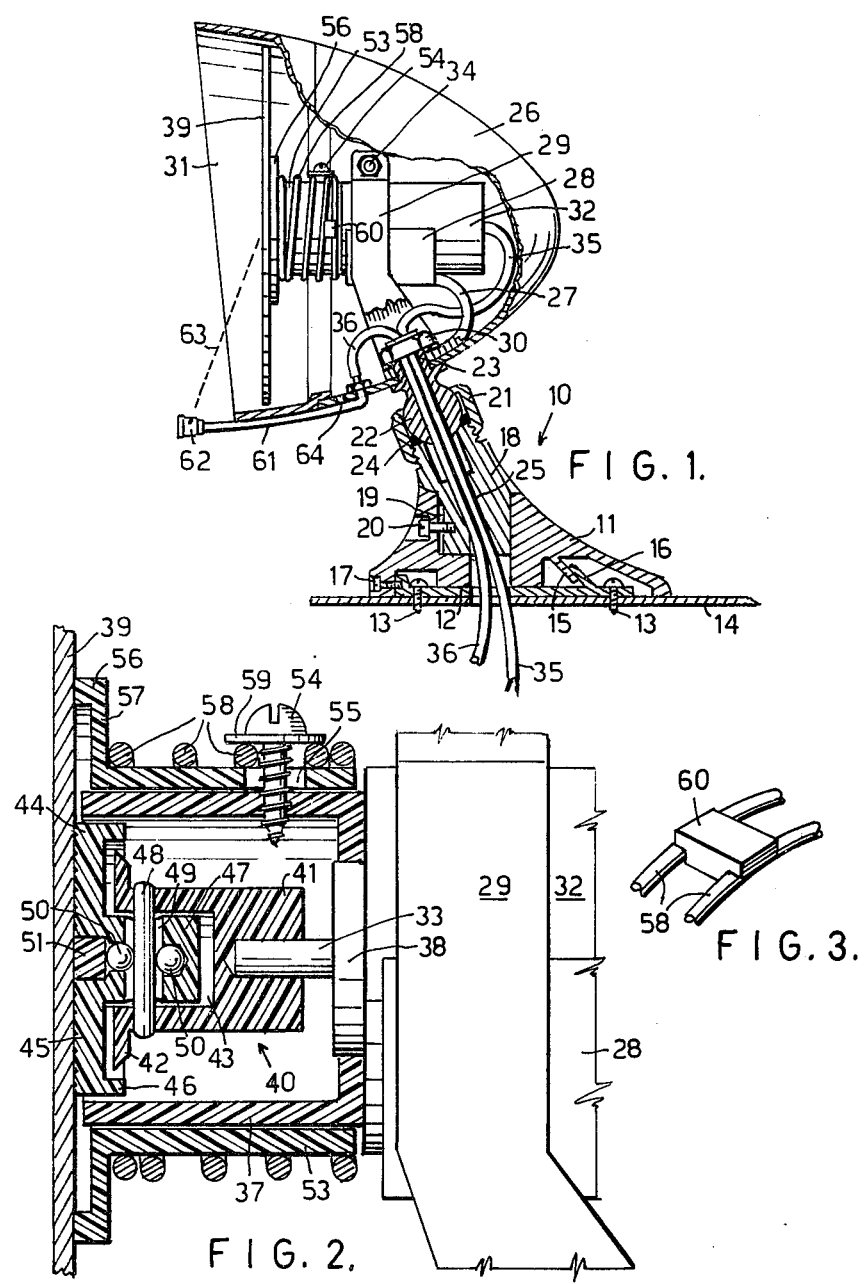

EXTERIOR-MOUNTED REAR ROTARY VISION MIRROR FOR A VEHICLE

BACKGROUND OF THE INVENTION

This invention relates to an exterior-mounted rear vision mirror for a vehicle.

An exterior-mounted rear vision mirror is generally acknowledged to be a very important aid to safety in driving. Its importance is likely to be greatly increased during rain when effectiveness of an internally-mounted rear vision mirror may be greatly diminished by poor visibility through the rear window; but in these conditions it is likely that rain drops or mist on an exterior-mounted mirror will greatly diminish its effectiveness.

An exterior-mounted mirror is also very likely to become soiled and obscured by dust and it may be so located that it is difficult or impossible to clean without stopping and leaving the vehicle.

It has been proposed, for example in Australian Patent Application No. 24507/71, to provide an exterior rear vision mirror rotatable about its axis within a housing open at the rear, the mirror being rotated either by the effect of air flow on vanes arranged about the mirror's periphery and extending outwardly of the housing, or by means of a small motor within the housing, so that rain drops will be thrown centrifugally from the mirror. However, it has been found that there is a very great loss of clarity in the reflection from a mirror which is rotated on an end of a motor drive shaft engaged in conventional bearings. If a driver looks, from at a 120mm diameter rotating mirror from a distance of 1 meter, at a reflection of a vehicle 15 meters behind the mirror, then if the mirror wobbles at its circumference by only 0.013mm to each side of vertical, then the image of the vehicle can appear to move by 0.75mm, and movement of this order is great enough to diminish very significantly the clarity of the reflected image, which will be too blurred to be acceptable as a safe rear vision mirror. The precision necessary to make an acceptable rotary rear vision mirror fixed perpendicularly to a motor drive shaft would be very difficult to achieve, and the product would be very costly.

SUMMARY OF THE INVENTION

The present invention has been devised with the general object of providing a rotary exterior-mounted rear vision mirror which is simple and inexpensive to manufacture, and in which the mirror is maintained without significant movement from the desired plane, so that the mirror, when driven in wet conditions, will remain effective and not be obscured by rain drops or mist. Another object achieved in a preferred embodiment of the invention is to provide such a rear vision mirror which, in dry and dusty conditions, may be quickly and easily washed clean.

With the foregoing and other objects in view, the invention resides broadly in an exterior-mounted rear vision mirror for a vehicle including a housing, open at the rear; mounting means for mounting the housing on a vehicle; a circular mirror mounted in the housing for rotation about its axis, and visible through the rear opening of the housing; drive means for rotating the mirror through a flexible coupling in the housing; and a stabilizer means bearing non-centrally on the mirror to cause its rotation to be substantially in a desired plane. Preferably the drive means is a motor within the housing, the flexible coupling connecting its drive shaft to the central part of the mirror, and preferably the stabilizer means is annular, substantially coaxial with the drive shaft, and is urged against the mirror by adjustable spring-loading means. It is preferred, too, that a nozzle be mounted on the assembly, directed to the central part of the rear surface of the mirror, means being provided for directing water through the nozzle under pressure, so the mirror may be cleaned, in dry conditions, by being rotated while water is directed on to its central part. Other features of the invention will become apparent from the following description.

BRIEF DESCRIPTION OF THE DRAWINGS

A preferred embodiment of the invention is shown in the drawings, wherein:

FIG. 1 is a partly broken-away side elevational view of a rear vision mirror according to the invention, FIG. 2 is a sectional view to larger scale of the coupling and drive of the mirror, and FIG. 3 is a perspective detail drawing of a part of the assembly.

DESCRIPTION OF THE PREFERRED EMBODIMENT

The rear vision mirror shown in the drawings includes a generally conventional adjustable mounting bracket 10. The base 11 of the bracket is recessed to fit over an attachment plate 12 secured by screws 13 to a part 14 of a car body. The base is held in place by the engagement of an internal flange 15 with a flange 16 of the attachment plate, and by means of a screw 17.

An adjustment arm 18 has one end engaged in a socket 19 in the base 11 and engaged by a screw 20 for oscillation about the axis of this screw. The other end of the adjustment arm is threaded for engagement by a socket nut 21 within which is a socket for a ball 22 from which there extends a flanged and threaded spigot 23. A resiliently deformable ring 24 is located within the socket nut 21 between the ball 22 and the end of the adjustment arm 18, so that by tightening the nut on the arm the ball may be locked releasably in adjusted position. A passage 25 is formed through the spigot 23 and ball 22, and through the adjustment arm 18, base 11, attachment plate 12 and car body part 14.

The threaded spigot 23 is passed through a hole in a mirror housing 26 and through corresponding holes in an end of the supporting arm 27 of a motor cradle 28, and in the bottom of a U-shaped motor clamp 29, and is then engaged by a nut 30.

The mirror housing 26 is of circular cross-section, and on its open rear end there is secured a rearwardly extending cowl 31. The motor cradle 28 supports within the housing 26 a small electric motor 32, its shaft 33 located coaxially within the housing. The two arms of the U-shaped motor clamp 29 are brought over the top of the motor and engaged by a clamp bolt 34, so that the motor is held very firmly in place relative to the housing 26.

The electrical leads 35 for the motor 32 are carried through the passage 25. A small flexible hose 36 is also carried through the passage into the housing for a purpose hereinafter explained.

A cylindrical member 37 is secured to the rear end of the motor 32 coaxially about the motor shaft 33. The motor shown in the drawings has extending from its rear end a bush 38 for the shaft 33, and the front end of the cylindrical member 37 is shaped to fit closely about this bush and flush against the rear end of the motor, to which it may be secured adhesively if desired.

A circular mirror 39 is rotatably mounted within the cowl 31 of the mirror housing 26 substantially coaxially with the motor shaft 33, to which it is coupled by a universal coupling 40 permitting a very slight angular movement of the axis of the mirror relative to the axis of the shaft.

The coupling 40 includes a female coupling member 41 in the form of a cylinder with a peripheral flange 42 at its rear end, an axial aperture being formed from its front end, in which the shaft 33 is fitted closely and secured adhesively. A larger diameter axial aperture 43 is formed from the rear of the coupling member. A male coupling member 44 includes a disc 45 which is adhesively secured coaxially to the mirror, its surface preferably being grooved for better adhesion. The disc 45 has a forwardly extending peripheral flange 46 and an integral forwardly extending coaxial cylindrical boss 47, which is engaged in the aperture 43 of the female coupling member with a small tolerance of, say, about 0.05mm. A coupling pin 48 is force fitted in diametrically opposed holes in the female coupling member 41 and passes through a slotted diametral hole 49 in the boss 47 of the male coupling member 44. A pair of bearing balls 50 housed in axial apertures in the boss 47 bear on the front and rear of the centre of the coupling pin 48, the ball 50 nearer to the mirror being permitted a degree of movement in its aperture, being against a resiliently deformable cylindrical plug 51 in a central hole formed from the rear end of the male coupling member 44.

A sleeve 53 of a plastics material is slidable but non-rotatable on the cylindrical member 37, a screw 54 passing through a slotted hole 55 in the sleeve and engaging in a tapped radial hole in the member 37. The end of the sleeve 53 nearer to the mirror is formed integrally with a stabilizer ring 56, which is an annular projection, coaxial with the mirror, extending rearwardly from the outer circumference of an integral peripheral flange 57 extending outwardly from the end of the sleeve 53 nearer to the mirror. The stabilizer ring 56 is maintained in firm contact with the mirror by a helical compression spring 58 about the sleeve 53, one end abutting against the peripheral flange 57, the spring, near to its other end, being held by a washer 59 on the screw 54. The pressure exerted by the spring on the stabilizer ring may be adjusted by slackening the screw 54, rotating the spring in one directon or the other, and re-tightening the screw so that, although the spring is held against rotation and against undue vibration, the sleeve 53 remains slidable on the cylindrical member 37. To dampen further any undue vibration of the spring, two similar damping pieces 60, shown particularly in FIG. 3, are engaged and secured adhesively between successive convolutions of the spring near its end further from the mirror, on opposite sides of the sleeve.

The flexible hose 36 is connected at one end to the water reservoir of the windscreen washer assembly (not shown) of the vehicle, so that when the washer is operated, water will be ejected through the hose 36 as well as through the usual washer hoses. The other end of the hose 36, within the mirror housing 26, is connected to one end of a water pipe 61 which passes out through the housing 26 and rearwardly and has connected to its rear end a nozzle 62 arranged so that water fed under pressure through the hose 36 will be directed, as indicated by the broken line 63, to the centre of the mirror 39.

A small water drainage outlet 64 is formed in the bottom of the mirror housing 26.

The mirror 39 is preferably of the type having a strongly coloured glass substrate to absorb glare-causing wave-lengths, its reflective rear surface being protected against scratching and weathering by a metal oxide coating.

The assembly is preferably so mounted on a vehicle as to be viewed by the driver through an area of windscreen cleaned by windscreen wipers. When the mirror is not being rotated by the motor 32, it is held firmly by the spring-loaded stabilizer ring 56, the front bearing ball 50 pressing the centre of the pin 48.

In wet conditions, the motor 32 is operated by means of a switch (not shown) convenient to the driver, to rotate the mirror, preferably at about 2,500 r.p.m. It will be found that after a very brief initial unsteadiness, the mirror will rotate without significant vibration, due to the spring-loaded stabilizer ring 56 bearing against the mirror, and the flexibility of the coupling 40. Any water on the mirror will be thrown centrifugally from it, and the projection of the cowl 31 beyond the mirror will ensure that the water is not thrown directly out to a side of the vehicle. The stabilizer ring ensures that the coupling 40 is sealed against water, and any water which may enter the housing will drain out through the hole 64. In light rain, the mirror may be rotated intermittently, as required, for ten or fifteen second periods. After the rain has ceased, the mirror will be left dry, and therefore with less likelihood of dust being deposited on it.

If, in dry conditions, the mirror should become dusty, it may be quickly cleaned by causing a jet of water to be projected through the nozzle 62 onto the centre of the mirror while the mirror is being rotated for a short period. In this way the mirror will quickly be brought to clean and dry condition.

The spring 58 ensures that the stabilizer ring 56 automatically adjusts to compensate for wear, and thus retains its precise setting and effective seal against water and dust. If pressure should be applied to the mirror, forcing it towards the motor, the spring-loaded stabilizer ring will yield and the boss 47 of the male coupling member 44 will be moved further into the aperture 43 of the female coupling member 41, the rear bearing ball 50 compressing and deforming the resilient plug 51. When the mirror has been moved under pressure a short distance it will be brought against the periphery of the fixed sleeve 37, which resists any further such movement, and ensures that the coupling 40 is not deformed or otherwise damaged.

I claim:

1. An exterior-mounted rear vision mirror assembly for a vehicle having a housing, open at the rear; mounting means connected to the housing and adapted to be mounted on a vehicle; a circular mirror mounted in said housing rotatably about its axis; a motor in said housing; a flexible coupling connecting the drive shaft of said motor to the central part of said mirror, and wherein the improvement comprises a stabilizer which under pressure bears non-centrally on said mirror and is adapted to maintain said mirror substantially in a single desired plane during rotation.

2. An exterior-mounted rear vision mirror assembly according to claim 1 in which said stabilizer comprises an annular member substantially coaxial with said mirror.

3. An exterior-mounted rear vision mirror assembly according to claim 2 in which said stabilizer is urged against the rear face of said mirror by adjustable spring-loading means.

4. An exterior-mounted rear vision mirror according to claim 1 wherein said flexible coupling comprises two coupling members, one secured to said mirror, the other secured to said motor drive shaft, and connecting means interconnecting said coupling members and adapted to restrain said mirror against rotation relative to the shaft while permitting axial movements of said mirror towards said shaft against pressure exerted on said mirror by said stabilizer.

5. An exterior-mounted rear vision mirror assembly according to claim 4 in which said coupling member secured to said motor drive shaft is a female member, said coupling member secured to said mirror is a male member engaged with clearance in the female member, and said connecting means includes a diametral pin through said female coupling member and through a longitudinal slotted hole formed diametrally through said male member.

* * * * *